United States Patent
Kwon et al.

(10) Patent No.: US 10,522,885 B2
(45) Date of Patent: Dec. 31, 2019

(54) SECONDARY BATTERY MODULE AND SECONDARY BATTERY PACK INCLUDING THE SAME

(71) Applicant: SK INNOVATION CO., LTD., Seoul (KR)

(72) Inventors: O Sung Kwon, Daejeon (KR); Seok Chun Cho, Daejeon (KR); Sei Hoon Cho, Daejeon (KR); Ho Chul Kang, Daejeon (KR); Dae Won Kwon, Daejeon (KR)

(73) Assignee: SK INNOVATION CO., LTD., Seoul (KR)

(*) Notice: Subject to any disclaimer, the term of this patent is extended or adjusted under 35 U.S.C. 154(b) by 149 days.

(21) Appl. No.: 15/626,990

(22) Filed: Jun. 19, 2017

(65) Prior Publication Data

US 2017/0365894 A1    Dec. 21, 2017

(30) Foreign Application Priority Data

Jun. 17, 2016 (KR) .................. 10-2016-0075993

(51) Int. Cl.
| | |
|---|---|
| *H01M 10/6551* | (2014.01) |
| *H01M 10/613* | (2014.01) |
| *H01M 2/10* | (2006.01) |
| *H01M 2/20* | (2006.01) |
| *H01M 2/30* | (2006.01) |

(Continued)

(52) U.S. Cl.
CPC ..... *H01M 10/6551* (2015.04); *H01M 2/1016* (2013.01); *H01M 2/1077* (2013.01); *H01M 2/202* (2013.01); *H01M 2/206* (2013.01); *H01M 2/305* (2013.01); *H01M 10/613* (2015.04);

(Continued)

(58) Field of Classification Search
None
See application file for complete search history.

(56) References Cited

U.S. PATENT DOCUMENTS

| | | | |
|---|---|---|---|
| 2010/0052692 A1 | 3/2010 | Yano et al. | |
| 2010/0151312 A1* | 6/2010 | Kim | H01M 2/202 |
| | | | 429/158 |
| 2016/0036019 A1 | 2/2016 | Gunna et al. | |

FOREIGN PATENT DOCUMENTS

| | | |
|---|---|---|
| EP | 2 362 463 | 8/2011 |
| EP | 2 955 780 | 12/2015 |

(Continued)

OTHER PUBLICATIONS

The extended European Search Report issued by the European Patent Office dated Nov. 30, 2017.

*Primary Examiner* — Daniel S Gatewood
(74) *Attorney, Agent, or Firm* — IP & T Group LLP

(57) ABSTRACT

The secondary battery module includes: A secondary battery module, comprising: a plurality of sub modules, each including battery cell and cooling fin wherein the battery is disposed on both side surfaces of the cooling fin; a cooling plate which is coupled to the plurality of the sub modules; and side structures having bus bars, wherein a terminal unit is disposed at each of the plurality of sub modules, wherein the terminal unit includes a contact terminal disposed between electrode tabs of the battery cells; and a wing terminal which extends outwardly from one end of the contact terminal, wherein the terminal unit disposed at one of the plurality of sub modules is connected with another terminal unit disposed at another sub module by one of the bus bars.

6 Claims, 6 Drawing Sheets

(51) Int. Cl.
   *H01M 10/625* (2014.01)
   *H01M 10/6556* (2014.01)
   *H01M 10/42* (2006.01)

(52) U.S. Cl.
   CPC ..... *H01M 10/625* (2015.04); *H01M 10/6556* (2015.04); *H01M 10/4257* (2013.01)

(56) References Cited

FOREIGN PATENT DOCUMENTS

| | | | |
|---|---|---|---|
| EP | 2955780 A1 * | 12/2015 | .......... H01M 2/1077 |
| JP | 2005-190885 | 7/2005 | |
| JP | 2007-323952 | 12/2007 | |
| JP | 2015-76187 | 4/2015 | |
| KR | 101355961 | 2/2014 | |
| WO | WO 2010/124562 | 11/2010 | |

* cited by examiner

SECONDARY BATTERY MODULE AND SECONDARY BATTERY PACK INCLUDING THE SAME

CROSS REFERENCE TO RELATED APPLICATIONS AND CLAIM OF PRIORITY

The application claims the benefit of Korean Patent Application No. 10-2016-0075993, filed on Jun. 17, 2016, at the Korean Intellectual Property Office, the disclosures of which are incorporated herein in their entirety by reference.

BACKGROUND OF THE INVENTION

1. Field of the Invention

The present invention relates to a secondary battery module and more particularly, to a secondary battery module which may be used to form a secondary battery pack with a reduced number of components included therein.

2. Description of the Related Art

Research of a rechargeable secondary battery has been actively conducted in a digital camera, a cellular phone, a laptop computer, a hybrid automobile, and the like. An example of the secondary battery includes a nickel-cadmium battery, a nickel-metal hydride battery, a nickel-hydrogen battery, and a lithium secondary battery. Among them, the lithium secondary battery, which operates at a voltage of 3.6 V or more, is used as a power supply for a portable electronic device, or is used for a high output hybrid automobile by connecting a plurality of lithium secondary batteries in series with each other. Since the lithium secondary battery operates at a voltage three times higher than that of the nickel-cadmium battery or the nickel-metal hydride battery, and has excellent energy density per unit weight which exceeds the nickel-cadmium battery or the nickel-metal hydride battery, the use of the lithium secondary battery has rapidly increased.

Generally, a secondary battery pack is formed of a plurality of battery modules arranged adjacent to each other, and a battery module includes 12 battery cells or 24 battery cells. Therefore, to increase energy, mounting a plurality of battery modules in the secondary battery pack may be necessary.

Since a conventional battery module generally includes 12 cells or 24 cells, the number of battery modules disposed in the secondary battery pack is increased. Accordingly, the number of components required for electrical connection and mechanical restraints between the battery modules is also increased. Therefore, when the weight of the secondary battery pack is increased, there are problems in that a volume density is decreased and the number of manufacturing processes is increased.

A conventional battery pack that includes a plurality of battery housing units in a stacking structure is disclosed in Korean Patent No. 10-1355961, registered on Jan. 21, 2014.

SUMMARY OF THE INVENTION

An object of the present invention is to provide a secondary battery module which has a rectangular shape and is capable of forming a secondary battery pack with a reduced number of components included therein.

In addition, another object of the present invention is to provide a secondary battery module having a space for a jig to be inserted for welding without requiring a separate component, by using a terminal unit including wing terminals.

Further, another object of the present invention is to provide a secondary battery module which is divided into an odd number of battery cells or an even number of battery cells, thereby reducing the number of bus bars used to connect lead-out terminals with each other, which are led out from the secondary battery module.

According to an aspect of the present invention, there is provided a secondary battery module, including: a sub module which includes a battery cell disposed on a cooling fin formed therein; a cooling plate which is coupled to a plurality of sub modules arranged adjacent to each other; side structures having a bus bar embedded therein; and a terminal unit configured to connect electrode taps of sub modules arranged adjacent to each other, wherein the terminal unit includes: a contact terminal disposed between a pair of electrode tabs to contact the electrode tabs; and a wing terminal which extends outwardly from one end of the contact terminal.

Herein, the wing terminal of the terminal unit may be positioned so as to face a wing terminal of another terminal unit adjacent to the terminal unit.

In addition, a jig insertion space may be provided inside of the wing terminals that face each other in a direction toward the battery cell.

Further, the bus bar coupled to the wing terminal may contact an outer side of the wing terminal which are positioned to face each other.

According to another aspect of the present invention, there is provided a secondary battery module, including: a sub module which includes a battery cell disposed on a cooling fin formed therein; a cooling plate which is configured to cool a plurality of sub modules arranged adjacent to each other and provide structural rigidity in a length direction thereof; and side structures which are coupled to side surfaces of the plurality of sub modules arranged adjacent to each other and have a bus bar embedded therein which is disposed between adjacent sub modules to electrically connect with each other, wherein the secondary battery module is formed in a rectangular shape.

According to another aspect of the present invention, there is provided a secondary battery pack including the secondary battery module of any one of the above-described inventions.

According to an embodiment of the present invention, the secondary battery module formed in a rectangular shape may form a secondary battery pack with the reduced number components included therein.

In addition, the secondary battery module may be provided with a space for inserting the jig without a separate component by using the wing terminals included in the terminal unit.

Further, the secondary battery module is divided into an odd number of battery cells or an even number of battery cells, such that it is possible to reduce the number of bus bars used to connect the lead-out terminals with each other, which are led out from the secondary battery module.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, specific embodiments of the present invention will be described with reference to the accompanying drawings. But, these are merely an example, and the present invention is not limited thereto.

In the description of the present invention, detailed descriptions of publicly known functions and configurations are omitted for conciseness. Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

However, persons who have a common knowledge in the technical field to which the present invention pertains will appreciate that such embodiments are provided for illustrative purposes and do not limit the subject matters to be protected as disclosed in the detailed description and appended claims. Therefore, it will be apparent to those skilled in the art that various alterations and modifications of the embodiments are possible within the scope and spirit of the present invention and duly included within the range as defined by the appended claims.

In a rectangular secondary battery module according to the present invention, a large number of battery cells may be packed all at once to thereby decrease the number of connection structures and accessory structures required for implementing a secondary battery pack. Therefore, the secondary battery module of the present invention may reduce assembly costs. In addition, due to a decreased number of components, volume and weight of the secondary battery pack are reduced, thereby implementing a high output battery pack.

Figure 1A:
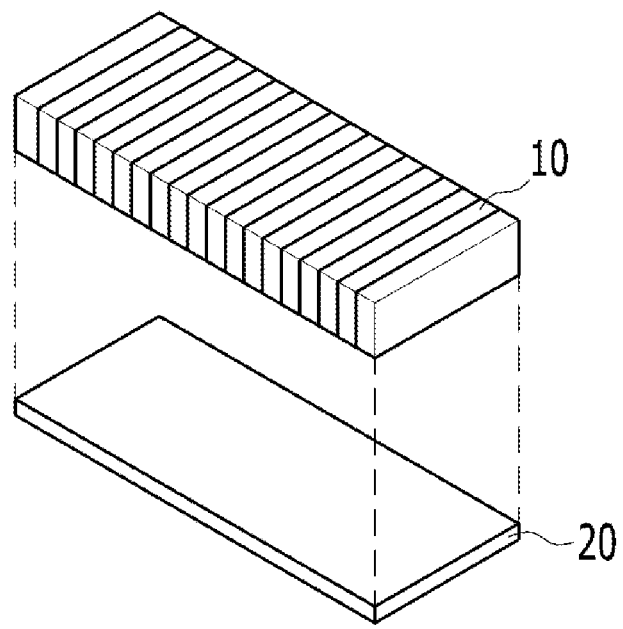
FIGS. 1A and 1B are perspective views illustrating a secondary battery module according to an embodiment of the present invention.
Figure 1B:
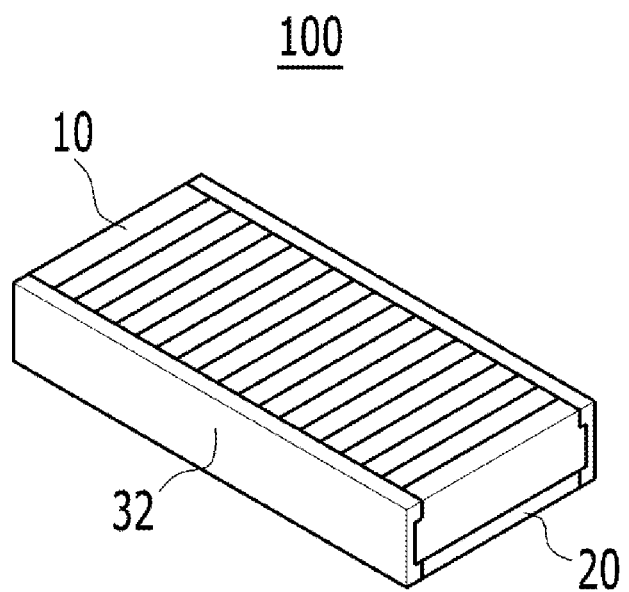
Figure 2A:
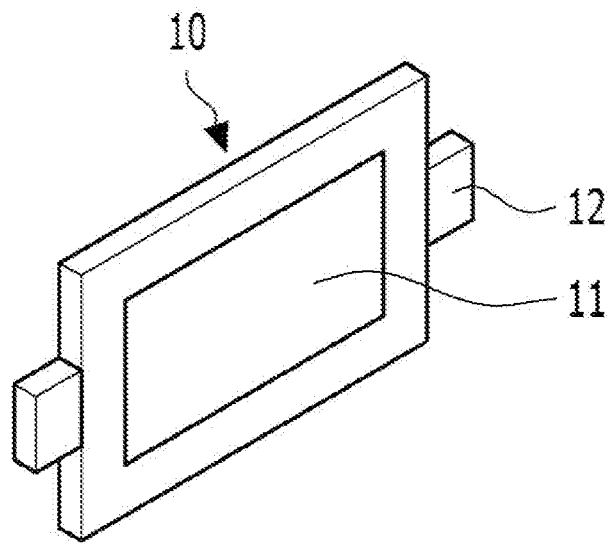
FIG. 2A is a perspective view illustrating a battery cell and FIG. 2B is a exploded view illustrating portion of secondary battery module according to an embodiment of the present invention.
Figure 2B:
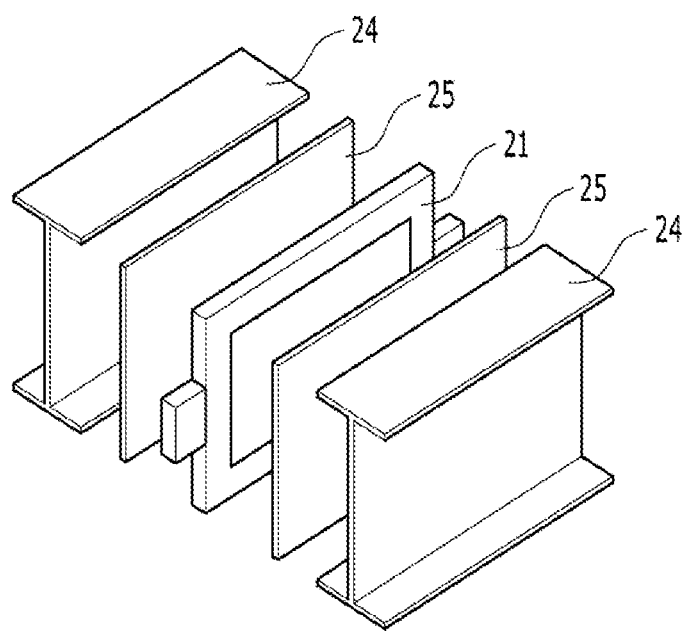

FIGS. 1A-1B are perspective views illustrating a secondary battery module 100 according to an embodiment of the present invention. FIGS. 2A-2B are perspective views illustrating a battery cell and cooling fin according to an embodiment of the present invention.

More particularly, FIG. 1A is an exploded perspective view of the secondary battery module 100 according to the embodiment of the present invention, and FIG. 1B is an assembled perspective view of the secondary battery module 100 according to the embodiment of the present invention.

More particularly, FIG. 2A is a perspective view illustrating a battery cell and FIG. 2B is a exploded view illustrating portion of secondary battery module according to an embodiment of the present invention.

Referring to FIGS. 1A, 1B, 2A, and 2B, the secondary battery module 100 according to the present invention may include a plurality of sub modules 10 which are continuously arranged in a predetermined direction.

The secondary battery module 100 according to the present invention has cooling fin 24. The cooling fin 24 serve to cool the secondary battery module 100 and are formed in an exterior thereof. Accordingly, the number of cover components of the battery module may be reduced.

The sub module 10 may include battery cells 11 and cooling fin 24. The battery cells 11 may be disposed on two sides or one side of the cooling fin 24 to form the sub module 10.

The cooling fin 24 may be formed in various shapes such as an "I" shape, a "T" shape, a "U" shape, and the like. For example, the cooling fin 24 may have an I-shaped cross section and extend in a longitudinal direction of the secondary battery module 100. The battery cells 11 are positioned on two sides of a cooling fin 24 and are arranged in the length direction of the submodule 10. The sub modules 10 are continuously arranged in a lateral direction to form one secondary battery module 100. Therefore, the cooling fin 24 may serve not only as a cooling structure but also as a case of the battery cell 11. In addition, an adhesive pad 25 may also be disposed between the battery cell 11 and the cooling fin 24 to couple the battery cell 11 with the cooling fin 24 by adhering the same.

Referring to FIG. 1A, in the secondary battery module 100 according to the embodiment of the present invention, a larger number of battery cells are packed in a given area than a conventional secondary battery module.

Generally, 12-cell or 24-cell unit modules form one secondary battery pack. However, the secondary battery module 100 according to the present invention may include the battery cells 11 of which the number is more than 12 or 24.

Comparing a conventional secondary battery pack which is formed by connecting four 12-cell modules, the secondary battery module 100 according to the present invention may include 48 cells packed as one module, thereby implementing the secondary battery pack. In a case in which a plurality of battery cells 11 are packed all at once, it is possible to reduce the number of structural components and electrical connection components such as a partition, an interface, and the like, which are disposed between the modules for fixing the modules when mounting the secondary battery module 100 in the secondary battery pack. When the number of components is decreased, the volume and the weight of the secondary battery pack may be reduced. Thus, a secondary battery pack having high energy density may be implemented.

The secondary battery module 100 may include a cooling plate 20 and side structures 32.

The cooling plate 20 may be coupled to the plurality of sub modules 10 which is arranged to form the secondary battery module 100. For example, the cooling plate 20 may be disposed below the plurality of sub modules 10 to supply cooled air to the module side. Further, the cooling plate 20 may provide a structural support to the secondary battery module 100 in a longitudinal direction.

Referring to FIGS. 1A and 1B, the side structures 32 may be disposed to provide the structural support of the plurality of sub modules 10 in the length direction.

Furthermore, when the length of the secondary battery module is increased, a reinforcement panel made of metal may be added in order to provide an additional support in the length direction.

In the secondary battery module 100 according to the embodiment of the present invention, the plurality of sub modules 10 are arranged, and the side structures 32 including a bus bar 40 (shown in FIGS. 4A, 4B, and 5) are coupled to both sides of the sub modules 10. After the plurality of sub modules 10 and the cooling plate 20 are coupled to each other, the side structures 32 may be coupled to both sides of the sub modules 10. The bus bar 40 may be embedded in the side structures 32 which are disposed at both sides of the sub modules 10. Specifically, in a state in which the plurality of sub modules 10 are arranged, terminal units 41 (shown in FIGS. 4A and 4B) are disposed between electrode tabs 12 of the adjacent battery cells 11 to electrically connect electrode tabs 12 with each other by the bus bar 40. In this case, the side structures 32 which are coupled to the plurality of sub modules 10 may have the bus bar 40 embedded therein. Therefore, when the side structures 32 are coupled to the sub modules 10, the bus bar 40 may be disposed on the terminal unit 41. The bus bar 40 and the terminal unit 41 will be described in detail below with reference to FIGS. 4A and 4B.

Further, when an additional structural support is required, the reinforcement panel made of metal may also be disposed outside the side structure 32. Therefore, even when the secondary battery module 100 includes the plurality of sub modules 10, it is possible to prevent a deformation or distortion of the secondary battery module 100 due to weight and provide a required structural strength.

Figure 3:
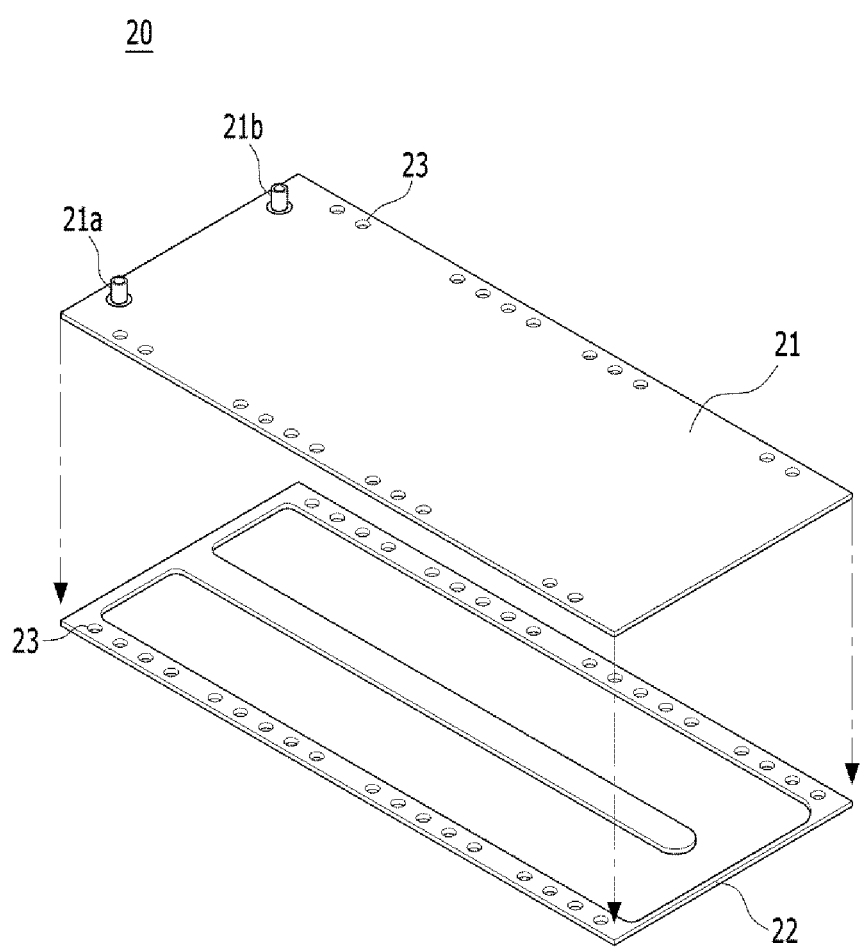
FIG. 3 is a perspective view illustrating a cooling plate of a secondary battery module according to an embodiment of the present invention.

FIG. 3 is an exploded perspective view illustrating the cooling plate 20 of the secondary battery module 100 according to an embodiment of the present invention.

Referring to FIG. 3, the cooling plate 20 may be disposed at a lower side of the secondary battery module 100.

The cooling plate 20 has an inlet 21*a* through which a coolant, a cooling channel (not shown) through which the coolant is circulated, and an outlet 21*b* through which the coolant is discharged. Herein, the cooling plate 20 may be manufactured by a method such as a process of vertically bonding an upper portion 21 of the cooling plate and a lower portion 22 of the cooling plate, extrusion, or the like.

The cooling plate 20 may be connected to the cooling fin 24 at a lower side of the secondary battery module 100. For example, the cooling plate and the cooling fin 24 may be connected by a fastening structure such as bolts (not shown). The cooling plate 20 may also have a plurality of fastening holes 23 formed in edge portions thereof and arranged in a length direction. Some of the plurality of fastening holes 23 may be fastened to the cooling fin 24, and the other fastening holes 23 may be fastened to a lower case 60 (shown in FIG. 6) of the secondary battery pack.

Figure 4A:
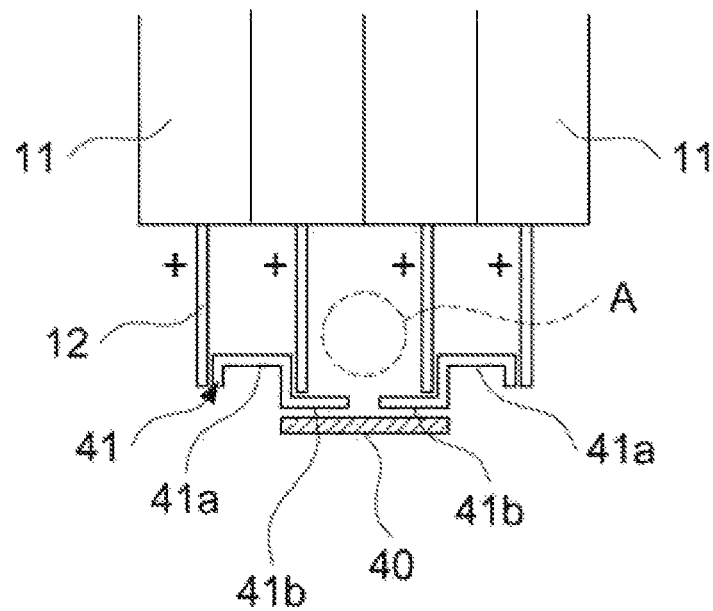
FIGS. 4A and 4B are cross-sectional views illustrating a terminal unit for connecting electrode tabs according to an embodiment of the present invention.
Figure 4B:
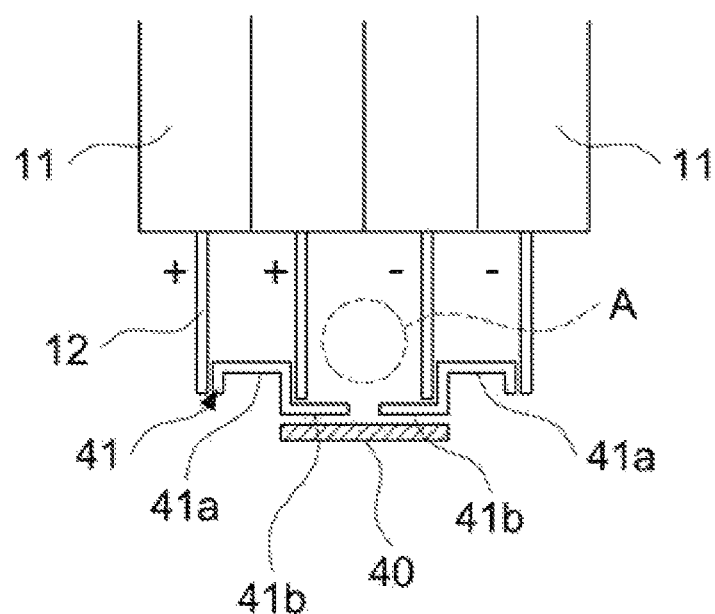
Figure 5:
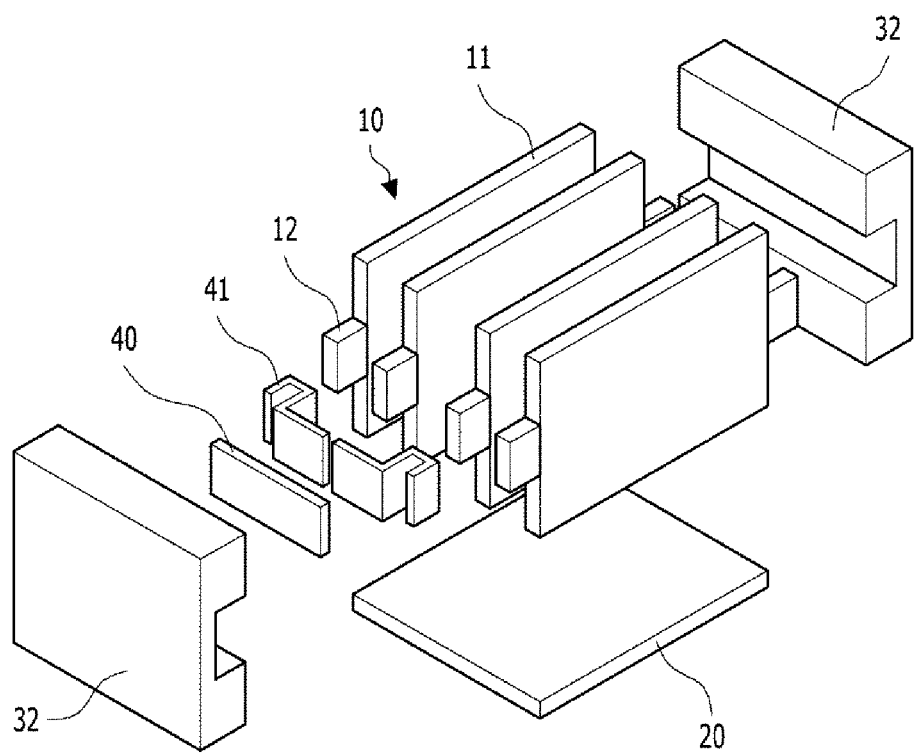
FIG. 5 is a disassembled perspective view illustrating of secondary battery module.

FIGS. 4A and 4B are a cross-sectional view illustrating a structure in which the electrode tabs 12 of the battery cells 11 according to an embodiment of the present invention are connected. FIG. 5 is a disassembled perspective view illustrating of secondary battery module Referring to FIGS. 4A, 4B, and 5, the battery cell 11 may include electrode tabs 12, and the electrode tabs 12 may include a cathode tab and an anode tab. Herein, the electrode tabs 12 may be connected to each other in series or in a parallel connection. FIG. 4A shows that the electrode tabs 12 having same polarities (for example, (+) polarity in FIG. 4A) are connected to each other in a parallel connection, and FIG. 4B shows that a pair of electrode tabs 12 having one polarities (for example, (+) polarity in the left side of FIG. 4B) are connected to a pair of electrode tabs 12 having the other polarities (for example, (−) polarity in the right side of FIG. 4B) by combination of series and parallel. The electrode tabs 12 may be connected through the bus bar 40.

The battery cell 11 may be provided with the terminal units 41 for connecting the electrode tabs 12 using the bus bar 40. The terminal unit 41 may connect the electrode tabs 12 of the adjacent sub modules 10 to each other.

The terminal unit 41 may include a contact terminal 41*a* which has a "U" shape and may contact a pair of electrode tabs 12, that is, the cathode tab and the anode tab, led out from the battery cell 11, and a wing terminal 41*b* which extends outwardly from one end of the contact terminal 41*a*. The wing terminal 41*b* may extend outwardly from one end of the contact terminal 41*a* contacting a pair of electrode tabs 12 in a direction in which the battery cells 11 are arranged, for example. However, in another embodiment, the wing terminal 41*b* may extend in an outer direction toward another adjacent terminal 41, rather than an inner direction.

The terminal units 41 disposed at the adjacent battery cells 11 among the plurality of battery cells 11 may be connected by the bus bar 40. Specifically, the wing terminals 41*b* of the adjacent battery cells 11 may face each other in a length direction. The wing terminal 41*b* of the terminal unit 41 may face the wing terminal 41*b* of another terminal unit adjacent to the terminal unit. The wing terminals 41*b* which face each other contact the bus bar 40 which is included in the side structure 32 such that the adjacent battery cells 11 may be electrically connected with each other.

Further, since the cooling fin 24 serves as an exterior of the battery cell 11, protective structures may be eliminated, and thereby an interval between the battery cells 11 may be narrowed. In this case, the wing terminals 41*b* define a space A into which a jig is inserted hereinafter, referred to as a jig insertion space A.

Specifically, the jig insertion space A may be provided inside of the wing terminals 41*b* that face each other in a direction toward the battery cell 11. Specifically, the jig insertion space A may be provided between two battery cells 11 adjacent to each other and may be defined by two neighboring wing terminals 41*b* and two neighboring electrode tabs 12. A jig may be inserted into the jig insertion space A and welded to the terminals 41 and the bus bar 40. Thus, a separate component for welding is not necessary. When the welding is completed, the jig may be removed from the jig insertion space A.

Side structure 32 are placed at both sides of a plurality of sub modules. The both sides of a plurality of sub modules 10 means sides where the electrode tabs 12 of sub modules 10 are withdrawn. Further, cooling plate 20 is placed at lower side of sub modules 10.

FIGS. 4A and 4B illustrate the electrode tabs 12 are connected to each other in series or in a parallel connection. However, the embodiment of the present invention is not limited thereto. The electrode tabs 12 may be connected to each other in various ways (for example, three battery cells may be connected to one another in a parallel connection, and three sets of battery cells connected in a parallel connection may be connected to one another in series (3P3S)).

Figure 6:
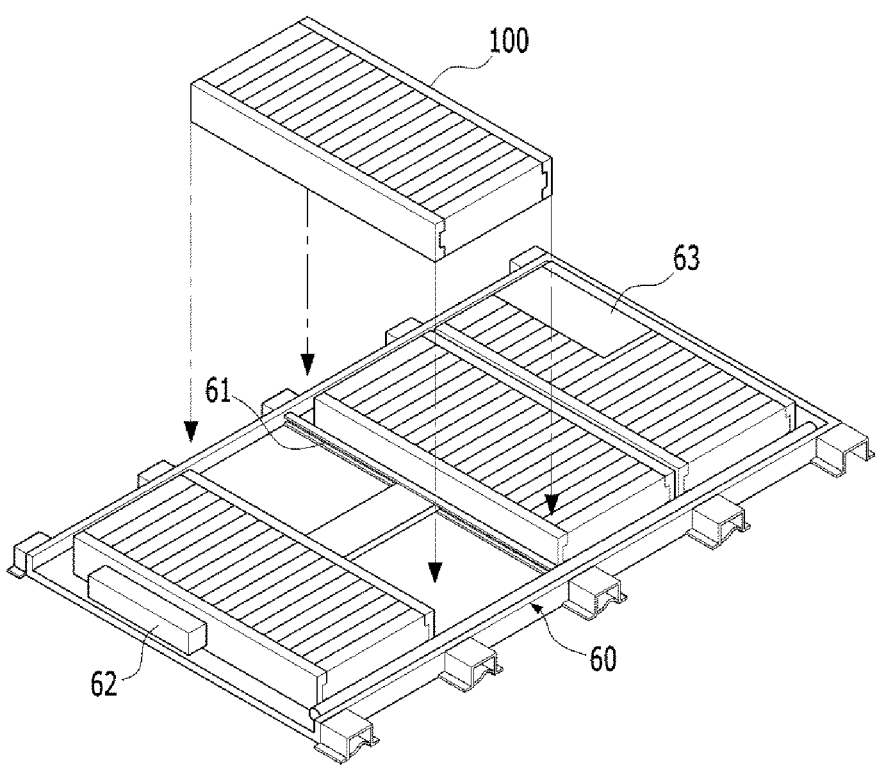
FIG. 6 is a perspective view illustrating a secondary battery pack including a secondary battery module according to an embodiment of the present invention.

FIG. 6 is a perspective view illustrating a secondary battery module 100 according to an embodiment of the present invention which is mounted in the secondary battery pack. Referring to FIG. 6, rectangular secondary battery modules 100 according to the present invention may be arranged on the lower case 60 of the secondary battery pack. One or more secondary battery modules 100 may be arranged on the lower case 60 For example, four secondary battery modules 100 including 48 battery cells 11 according to the present invention may be arranged to form one secondary battery pack.

The lower case 60 may include cross members 61. The cross members 61 may be disposed on a bottom surface of the lower case 60 sand have sizes and shapes corresponding to the secondary battery modules 100. When the secondary battery module 100 is mounted on the cross member 61, the side structures 32 (shown in FIG. 1B) disposed in the secondary battery module 100 may serve as an additional cross member 61. Since the side structures 32 serve as the cross member 61, a load of force applied thereto may be dispersed, thereby preventing warpage of the plurality of secondary battery modules 100 disposed in the secondary battery pack.

Furthermore, a relay 61, a battery management system 63, and the like may be mounted at one or both sides of the secondary battery pack.

In addition, the respective secondary battery modules arranged in the secondary battery pack may also be divided into two. The secondary battery module may include a first secondary battery module and a second secondary battery module. A plurality of battery cells of the first secondary battery module and the second secondary battery module may be connected in series or in parallel with each other. When the respective battery cells are connected in series, the electrode tabs 12 of the battery cell 11 may be formed in an "L" shape to be connected to each other. When the respective battery cells are connected with each other in parallel, the respective electrode tabs 12 may be connected through the bus bar 40.

Furthermore, in the secondary battery pack, a safety plug or MSD may be inserted between lead-out terminals through which a half of entire voltage of the secondary battery pack is led out in order to secure safety during the secondary battery separating process. The safety plug is positioned on the rear side of the secondary battery pack, and the same number of modules may be disposed at the left side and the right side of the secondary battery pack. In the secondary battery module according to the present embodiment, the lead-out terminal is provided in a middle portion of the secondary battery module in order to dispose the secondary battery module such that the secondary battery module may be separated into two secondary battery modules.

The secondary battery module may be separated into the first secondary battery module and the second secondary battery module. Since the two separated secondary battery modules are configured so that the odd number of battery cells are connected to each other in series, cathodes and anodes of the lead-out terminals which are led out of the two secondary battery modules may be positioned diagonally with respect to each other.

In the adjacent secondary battery modules, the separated first secondary battery module and the second secondary battery module may be formed at positions different from each other. For example, when the first secondary battery module is disposed on an upper side and the second secondary battery module is disposed on a lower side in a secondary battery module in a first row, the second secondary battery module is disposed on the upper side and the first secondary battery module is disposed on the lower side in a secondary battery module in a second row adjacent to the first row. The first secondary battery module and the second secondary battery module may be disposed adjacent to each other, so that a lead-out terminal of the cathode and a lead-out terminal of the anode, which are led out from each of the first secondary battery module and the second secondary battery module, may face each other.

Therefore, when connecting a final lead-out terminals facing each other to each other, the secondary battery modules are connected to each other in series, and the electrical connection path by the external bus bar may be minimized.

Although the representative embodiments of the present invention have been described in detail, it will be understood by persons who have a common knowledge in the technical field to which the present invention pertains that various modifications and variations may be made therein without departing from the scope of the present invention. Accordingly, the scope of the present invention should not be limited to the above-described embodiments, but be defined by the appended claims as well as equivalents thereof.

DESCRIPTION OF REFERENCE NUMERALS

100: secondary battery module
10: sub module
11: battery cell
12: electrode tab
20: cooling plate
21: upper portion of cooling plate
22: lower portion of cooling plate
21*a*: inlet
21*b*: outlet
23: fastening hole
24: cooling fin
25: adhesive pad
32: side structure
40: bus bar
41: terminal unit
41*a*: contact terminal
41*b*: wing terminal
60: lower case
61: cross member
62: relay
63: battery management system
A: jig insertion space

What is claimed is:

1. A secondary battery module, comprising:
a plurality of sub modules including battery cells;
a cooling plate which is coupled to the plurality of the sub modules; and
side structures configured to cover the plurality of sub modules, the side structures having bus bars located to face a covered surface of the plurality of sub modules,
wherein a terminal unit is disposed at each of the plurality of sub modules,
wherein the terminal unit includes a contact terminal disposed between electrode tabs of the battery cells, and a wing terminal which extends outwardly from one end of the contact terminal, and
wherein the terminal unit disposed at one of the plurality of sub modules is connected with another terminal unit disposed at another sub module by one of the bus bars.

2. The secondary battery module of claim 1, wherein the wing terminal of the terminal unit is positioned to face a wing terminal of another terminal unit adjacent to the terminal unit.

3. The secondary battery module of claim 2, wherein a jig insertion space is provided between the wing terminals that face each other and the corresponding battery cells.

4. The secondary battery module of claim 2, wherein the bus bar coupled to the wing terminal contacts an outer side of the wing terminal which is positioned to face each other.

5. A secondary battery module, comprising:
- a sub module which includes a battery cell;
- a cooling plate which is configured to cool a plurality of sub modules arranged adjacent to each other and provide structural rigidity in a length direction thereof; and
- side structures configured to cover a plurality of sub modules, the side structures having bus bars located to face a covered surface of the plurality of sub modules,
- wherein the bus bar is disposed between adjacent sub modules to electrically connect adjacent sub modules with each other.

6. A secondary battery pack comprising the secondary battery module of claim 1.

* * * * *